(12) United States Patent
Brendle et al.

(10) Patent No.: US 8,201,981 B2
(45) Date of Patent: Jun. 19, 2012

(54) PROJECTION MODULE FOR A MOTOR VEHICLE HEADLIGHT

(75) Inventors: Matthias Brendle, Tuebingen (DE); Matthias Gebauer, Reutlingen (DE)

(73) Assignee: Automotive Lighting Reutlingen GmbH (DE)

( * ) Notice: Subject to any disclaimer, the term of this patent is extended or adjusted under 35 U.S.C. 154(b) by 305 days.

(21) Appl. No.: 12/703,884

(22) Filed: Feb. 11, 2010

(65) Prior Publication Data

US 2010/0226142 A1 Sep. 9, 2010

(30) Foreign Application Priority Data

Feb. 12, 2009 (DE) .................. 10 2009 008 631

(51) Int. Cl.
*B60Q 1/14* (2006.01)
(52) U.S. Cl. ...................... 362/538; 362/514
(58) Field of Classification Search .................. 362/538, 362/539, 512, 514
See application file for complete search history.

(56) References Cited

U.S. PATENT DOCUMENTS

| | | | | | |
|---|---|---|---|---|---|
| 4,800,467 A | * | 1/1989 | Lindae et al. | ................. | 362/539 |
| 4,862,329 A | * | 8/1989 | Nino | .............................. | 362/539 |
| 5,702,174 A | * | 12/1997 | Dobler | .......................... | 362/496 |
| 2010/0110715 A1 | * | 5/2010 | Nakada | ........................ | 362/538 |

* cited by examiner

*Primary Examiner* — David V Bruce
(74) *Attorney, Agent, or Firm* — Donald R. Boys; Central Coast Patent Agency, Inc.

(57) ABSTRACT

The invention relates to a projection module for a headlight. The module generates light distributions with light sources switchable independently. In order to generate a first distribution, light from a first group is coupled into an optical element in the beam path. The optical element has a reflecting underside having a contour corresponding to the bright-dark boundary. The light coupled out from the optical element is projected by a lens for generating the first distribution. A further light group is additionally activated in order to generate a second distribution. The light emitted by this group illuminates a region of the light distribution above the bright-dark boundary. Part of the light from this group is coupled into the optical element, mixes there with the light from the first group and is then coupled out together to generate an unsharp bright-dark boundary.

27 Claims, 8 Drawing Sheets

PROJECTION MODULE FOR A MOTOR VEHICLE HEADLIGHT

The present application claims priority to German patent application serial number 10 2009 008 631.5, which was filed on Feb. 12, 2009, which is incorporated herein in its entirety, at least by reference.

The present invention relates to a projection module for a motor vehicle headlight for generating at least one predetermined light distribution. The module comprises a plurality of light sources for emitting electromagnetic radiation, at least one primary optical unit for concentrating the radiation emitted by the light sources, and a secondary optical unit arranged in the beam path of the concentrated radiation and serving for imaging the radiation beam on a roadway in front of the motor vehicle. Moreover, the invention relates to a motor vehicle headlight comprising a housing and, arranged therein, a light module for generating at least one predetermined light distribution.

The prior art discloses projection systems for vehicle headlights which can project different light distributions and bright-dark boundaries onto the road by means of changeover. The different light functions are realized by motor-adjustable diaphragms arranged in the diaphragm plane of the projection systems. The individual light distributions are thus realized by targeted shading of light beams, which usually originate from an individual light source, mainly from a gas discharge lamp.

Furthermore, the prior art discloses luminous units comprising semiconductor light sources (LEDs) which generate low-beam light or high-beam light distributions normally from a plurality of LEDs by means of projection or reflection optical units. In contrast to headlights comprising gas discharge lamps, LED headlights generally require not only a plurality of light sources, that is to say so-called LED chips, but also a multiplicity of associated projection or reflection optical units, such that the total light distribution of LED headlights is generally formed by the superimposition of the light distributions of a plurality of light modules. In some instances attempts are now being made to use the movable diaphragms introduced in light modules comprising gas discharge lamps in LED projection systems as well, in order thus to integrate a plurality of low-beam light and/or high-beam light functions in one light module. However, the modulation of relatively high luminous fluxes by shading is particularly disadvantageous here owing to the system-dictated low light power of the LED light modules.

These disadvantages are avoided if the beam path for the respective light functions is divided in the diaphragm plane of the projection module, such that the radiation beams required for the individual light functions can be generated by different, independently switchable light sources. It is thus possible to present a plurality of light functions without movable diaphragms—merely by switching the light sources. The division of the beam path can be achieved depending on the underlying physical principle by means of refraction, reflection or absorption.

In DE 10 2007 052 696, a low-beam light beam path is formed by means of the totally reflecting surface of an optical element in the form of a glass body, the edge of which generates a bright-dark boundary. For this purpose, the course of the edge corresponds to the course of the bright-dark boundary. In order to improve the illumination of the light distribution for the low-beam light (e.g. at the point 75R or in the region of the 15° bend of the bright-dark boundary), the use of a further light source and of a further optical element is proposed, which couple additional light into the main optical element. As an alternative, a light distribution for high-beam light can also be generated by means of the main optical element, the lower edge of the optical element then having a straight course.

A further embodiment possibility is described in US 2006/0120094, wherein the beam path is divided above and below the bright-dark boundary by means of two reflective surfaces which taper sharply to a knife edge in the focal plane of the lens. This edge has the contour of the desired bright-dark boundary and is projected onto the road by the lens. This system can—with lower efficiency—also be embodied with absorbent surfaces.

The troublesome point in all these known systems is the presentation of the bright-dark boundary: The difficulty consists in separating the beam paths of the different light functions in such a way that, in the case of low-beam light, no light is scattered beyond the bright-dark boundary (no crosstalk) and, in the case of high-beam light, no dark or colored line remains at the location of the low-beam light bright-dark boundary.

Proceeding from the prior art described, the present invention is based on the object of providing a light module for a motor vehicle headlight which can present at least two different light distributions simply by changing over a plurality of light sources.

In order to achieve this object, proceeding from the projection module of the type mentioned in the introduction, it is proposed that the light sources are subdivided into at least two groups, wherein, for generating at least two different light distributions, the different light source groups can be activated independently of one another, wherein an optical element for generating a horizontal bright-dark boundary of a low-beam light distribution is arranged in the beam path of a radiation beam emitted by a first light source group, between the at least one primary optical unit and the secondary optical unit, and wherein a further light source group can additionally be activated in order to generate a high-beam light distribution, wherein the radiation beam emitted by the further light source group illuminates a region of the light distribution above the bright-dark boundary.

The invention comprises a projection system having at least two light source groups which can be switched independently of one another. An optical element, e.g. in the form of a contoured glass body, one end face of which lies approximately in the focal plane of the lens, delimits the beam path of one light source group by total reflection such that a low-beam light distribution can be obtained by imaging the beam path delimited in this way on the road.

By switching in the second light source group, it is possible to illuminate the region above the bright-dark boundary, whereby together with the light from the first (low-beam light) light source group a high-beam light is formed. In this case, it is advantageous that the (high-beam light) light beam from the second light source group is not totally reflected and therefore also not delimited by the glass body. As a result, both beam paths can mix in the glass body and the bright-dark boundary blurs or disappears completely when the second light source is switched in.

In this case, the high-beam radiation beams from the second light source group are coupled in part into the same optical element. In the optical element, the coupled-in light beams can mix with the low-beam light radiation beams from the first light source group. As a result, the light distribution in the region of the bright-dark boundary is blurred and becomes unsharp. In this way, it is possible to effectively prevent, in the case of high-beam light, a dark or colored line from remaining at the location of the low-beam light bright-dark boundary.

As a result of the integration of at least two light functions in one light module, secondary optical unit, cooling for the light sources, pivoting actuator system for dynamic cornering light and/or for luminous range regulation and actuator system for the basic setting of the headlight can be utilized jointly for both functions.

Advantageously, the light sources are in each case embodied as semiconductor light sources or as an arrangement of a plurality of semiconductor light sources (so-called LED arrays). If the focusing primary optical unit for the low-beam light beam path is embodied as a totally reflecting optical unit, that is to say with a glass body, then the totally reflecting surface for delimiting the low-beam light beam path and shaping the bright-dark boundary can be integrally formed directly on the glass body of the focusing optical unit.

If, instead of a light distribution for high-beam light, a light distribution for partial high-beam light is intended to be achieved by switching in the second light source, then this necessitates a further absorbent diaphragm having a vertical edge, which is positioned in the focal plane of the secondary optical unit (e.g. projection lens) and delimits the high-beam light radiation beam such that the typical vertical bright-dark boundary of the light distribution for partial high-beam light is thereby formed.

The projection module according to the invention makes it possible to generate a light distribution for low-beam light with a horizontal bright-dark boundary and a light distribution for high-beam light or, as an alternative, a light distribution for low-beam light and a light distribution for partial high-beam light with a horizontal and a vertical bright-dark boundary. The light distribution for high-beam light or for partial high-beam light is therefore formed by switching in one or a plurality of light sources of the light source group for high-beam light rather than by screening/shading by means of a motor-adjustable diaphragm. In the case of the light distribution for partial high-beam light, the light module of the right installation side generates a light distribution on the right of the vertical bright-dark boundary, and the light module of the left installations side forms a light distribution for partial high-beam light on the left of the vertical bright-dark boundary.

The light modules of both installation sides can be pivoted about a vertical axis by means of an electrical drive in order to realize a dynamic cornering light. In this case, the pivoting angle of the light modules is determined depending on a steering angle, a transverse acceleration force, a yaw rate, a rolling angle, a pitch angle and/or other variables of the motor vehicle appertaining to driving dynamics. It is also conceivable to determine the pivoting angle on the basis of the current position of the motor vehicle and the corresponding data of a vehicle navigation system and/or on the basis of detection and evaluation of the course of the roadway in front of the vehicle.

Various preferred exemplary embodiments of the invention are explained in greater detail below with reference to the figures, in which.

The invention relates to a projection module for a motor vehicle headlight comprising a plurality of light sources which can be switched independently of one another and each have a dedicated focusing primary optical unit. The light sources are preferably embodied as semiconductor light sources (Leeds or LED arrays, wherein an LED array comprises a plurality of Leeds preferably arranged in matrix-like fashion). The primary optical units focus the light emitted by the Leeds in the focal plane of a secondary optical unit, which is embodied as an imaging lens, for example. The lens projects the light distribution formed by the focusing primary optical units onto the road. The focusing primary optical units are hereinafter also referred to as attachment optical units and can be embodied as reflectors or lenses according to the reflection or projection principle.

In the figures, the projection module according to the invention is designated in its entirety by the reference symbol 1. It comprises a first group of one or more LEDs 2 and a second group of one or more LEDs 3. The LEDs 2, 3 are arranged on a heat sink 4 for the purposes of heat dissipation during the operation of the LEDs 2, 3. The heat sink 4 is produced from a material that conducts heat well, in particular from a metal, and has cooling fins 4a for increasing the surface area and for improving the cooling effect. The heat sink 4 can be actively cooled by means of a fan (not illustrated).

Figure 1:
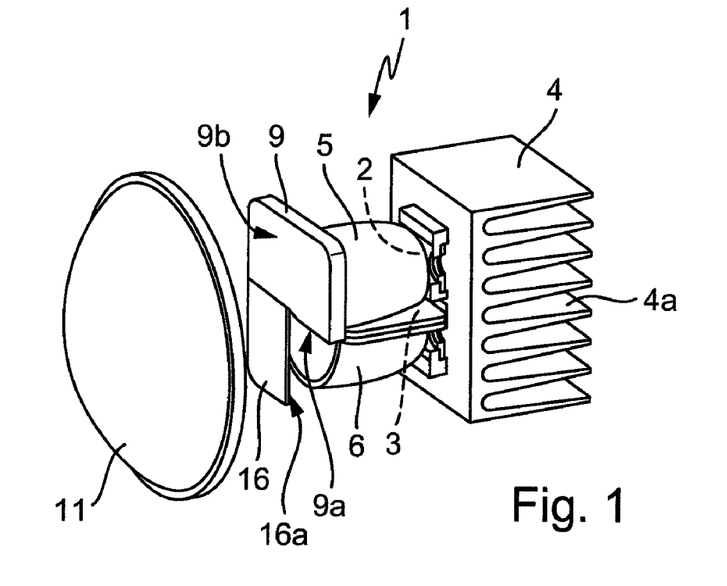
FIG. 1 shows a projection module according to the invention in accordance with a first preferred embodiment in a perspective view.
Figure 2:
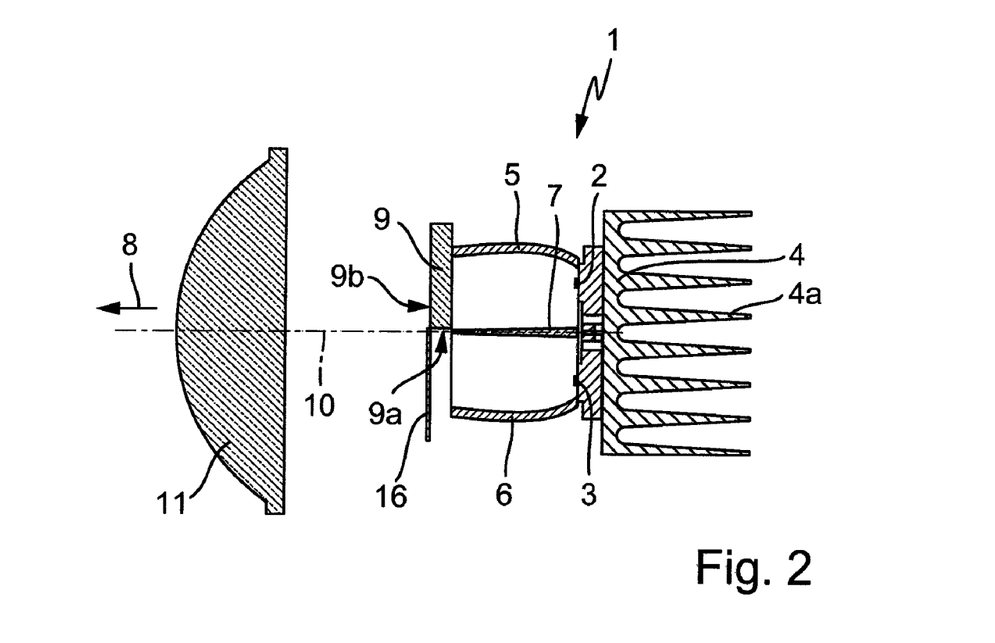
FIG. 2 shows the projection module from FIG. 1 in longitudinal section.

In the exemplary embodiment illustrated in FIGS. 1 and 2, the focusing primary optical units are in each case embodied as reflectors 5, 6, in particular as half-shell reflectors. It goes without saying that the primary optical units 5, 6 can also in each case individually or both be embodied as an optical element in the form of a totally reflecting attachment optical unit, in particular as an optical waveguide or glass body. A partition 7 is arranged in a substantially horizontal plane comprising an optical axis 10 of the projection module 1, said partition covering at least part of the area between the two reflectors 5, 6. The partition 7 is preferably reflectively coated. An optical element 9 embodied as an optical waveguide is arranged in the light exit direction 8 downstream of the upper primary optical unit 5 assigned to the first light source group 2. The optical element 9 preferably consists of a transparent material, e.g. a plastic or glass. It has the form of a rectangle as viewed in the light exit direction 8 and the form of a parallelepiped in perspective view. A longitudinal side (light coupling-in surface) of the optical element 9 practically completely covers the light exit surface of the first primary optical unit 5, such that the entire light emitted by the first light source group 2 is coupled into the optical element 9 via the light coupling-in surface.

Figure 5:
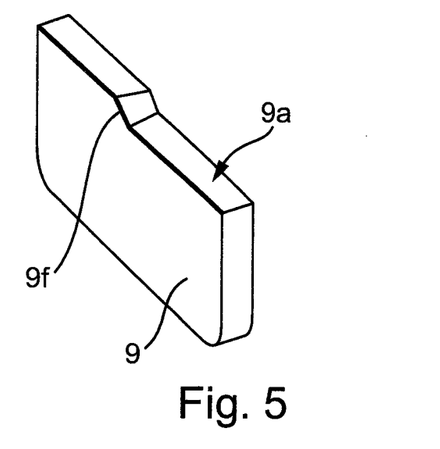
FIG. 5 shows an optical element of a projection module according to the invention in detail.
Figure 13:
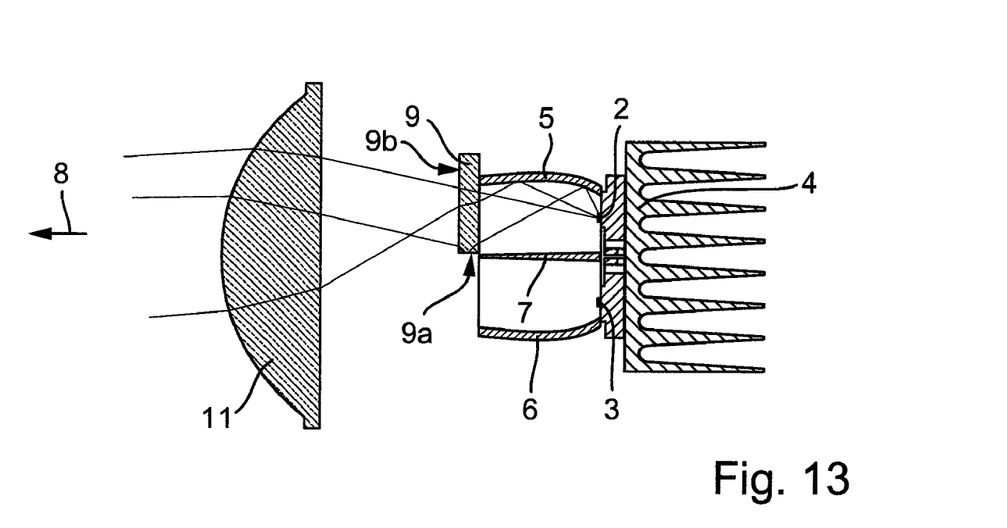
FIG. 13 shows the projection module from FIG. 2 with a beam path for generating a light distribution for low-beam light with a bright-dark boundary.

The coupled-in light is totally reflected at least in part at a totally reflecting underside 9a of the optical element 9, and then coupled out from the optical element 9 in the light exit direction 8 through a light coupling-out surface 9b of said optical element. The corresponding beam path is illustrated by way of example in FIG. 13. Part of the coupled-in light passes from the light coupling-in surface directly to the light coupling-out surface 9b and is deflected only slightly on its way through the optical element 9. The underside 9a of the optical element 9 has, in an imaginary sectional plane transversely with respect to the optical axis 10, a course corresponding to the course of the bright-dark boundary (cf. FIG. 5). That edge of the optical element 9 which serves for generating the bright-dark boundary is highlighted in bold and designated by the reference symbol 9f.

A secondary optical unit in the form of a projection lens 11 is arranged downstream of the optical element 9 in the light exit direction. It projects the radiation emerging from the coupling-out surface 9b of the optical element 9 as an asymmetrical light distribution for low-beam light onto the roadway. Depending on the course of the totally reflecting underside 9a of the optical element 9, the course of the bright-dark boundary can vary. The bright-dark boundary preferably comprises two horizontal sections extending in a manner offset with respect to one another in a vertical direction, wherein the transition between the two sections has either an oblique (e.g. 15° rise) or a vertical (e.g. stepped rise) course. A bright-dark boundary having a simple straight horizontal course is also conceivable.

Figure 14:
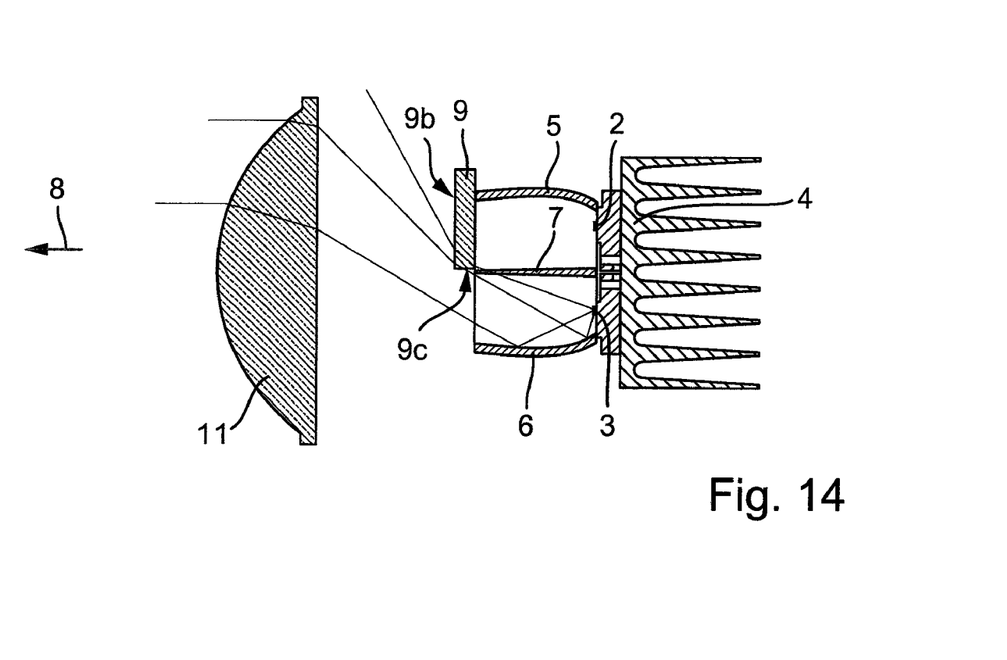
FIG. 14 shows the projection module from FIG. 2 with a beam path for illuminating a region on a measurement screen arranged in front of the projection module above the light distribution for low-beam light.

In order to change over the light module 1 illustrated in FIGS. 1 and 2 for generating a further light distribution, the second group of light sources 3 is activated in addition to the first light source group 2. In order to be able to better explain the principle of the light module 1 according to the invention, however, firstly an explanation will be given, with reference to FIG. 14, of what happens if only the second light source group 3 (without the first light source group 2) is activated. The light emitted by the LED or LEDs 3 is firstly concentrated by the primary optical unit 6. The reflector 6 is embodied and arranged relative to the LEDs 3 in such a way that a large part of the light leaves the primary optical unit 6 through a light exit surface without impinging on the optical element 9. However, part of the light emitted by the LEDs 3 impinges on the underside 9a of the optical element 9. In this case, the light beams impinge on the underside 9a at an angle such that they are coupled into the optical element 9 and are subsequently coupled out again via the coupling-out surface 9b. That location of the optical element 9 at which some of the light beams emitted by the LEDs 3 are coupled into the optical element 9 is designated by the reference symbol 9c.

In the exemplary embodiment illustrated in FIGS. 1 and 2, the configuration and arrangement of the partition 7 between the two primary optical units 5, 6 primarily prevents light from the low-beam light LEDs 2 from impinging on the lens 11 past the optical element 9, since this light would otherwise be visible above the bright-dark boundary 13 and would thus cause other road users to be dazzled. Moreover, the partition 7 prevents light emitted by the high-beam light LEDs 3 from entering into the optical element 9 via the coupling-in surface facing the first primary optical unit 5. It goes without saying however, that it would also be conceivable for part of the light emitted by the high-beam light LEDs 3 to be reflected from the reflector 6 onto the coupling-in surface of the optical element 9 and to be coupled into the optical element 9 via said coupling-in surface.

If the high-beam light LEDs 3 are activated in addition to the low-beam light LEDs 2, the beam paths of the low-beam light LEDs 2 and of the high-beam light LEDs 3 mix in the optical element 9 and the bright-dark boundary blurs or disappears completely. This gives rise to a light distribution for high-beam light without disturbing dark or colored lines at the location of the low-beam light bright-dark boundary.

Figure 3:
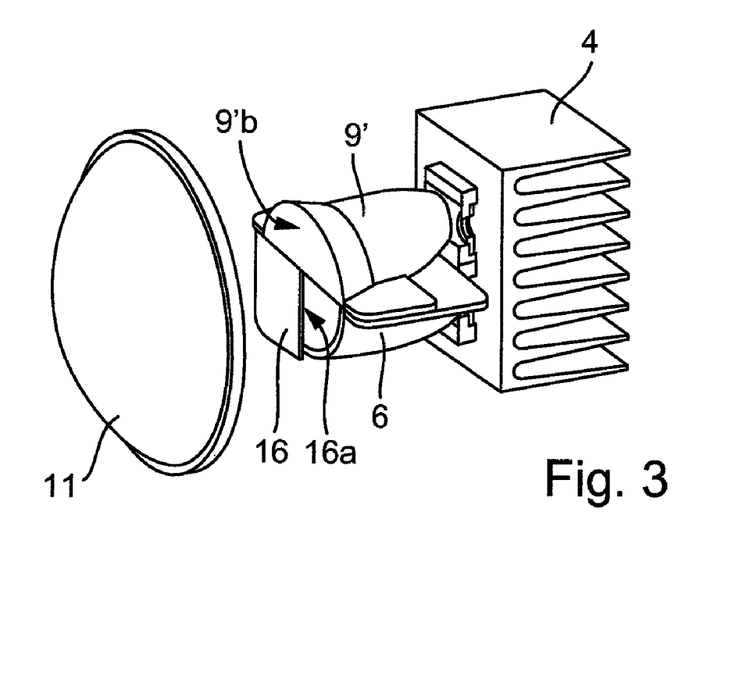
FIG. 3 shows a projection module according to the invention in accordance with a second preferred embodiment in a perspective view.
Figure 4:
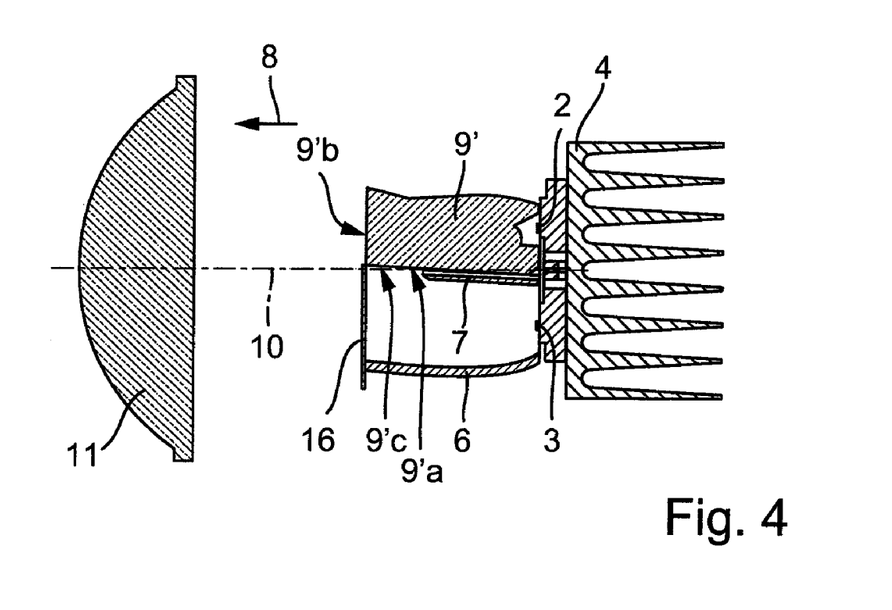
FIG. 4 shows the projection module from FIG. 3 in longitudinal section.
Figure 6:
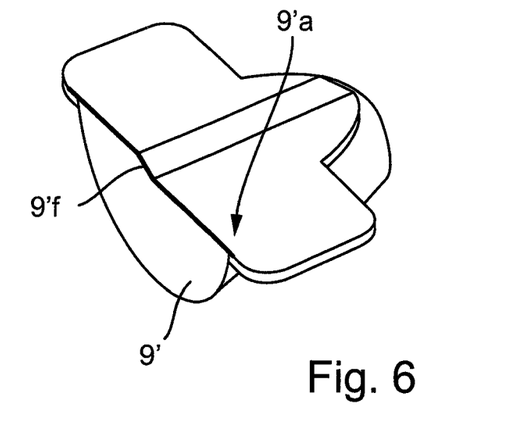
FIG. 6 shows a primary optical unit of a projection module according to the invention in detail.
Figure 7:
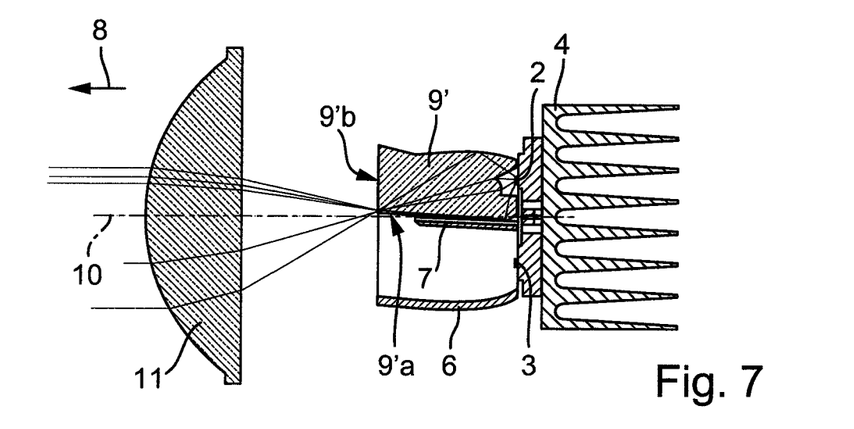
FIG. 7 shows the projection module from FIG. 4 with a beam path for generating a light distribution for low-beam light with a bright-dark boundary.
Figure 8:
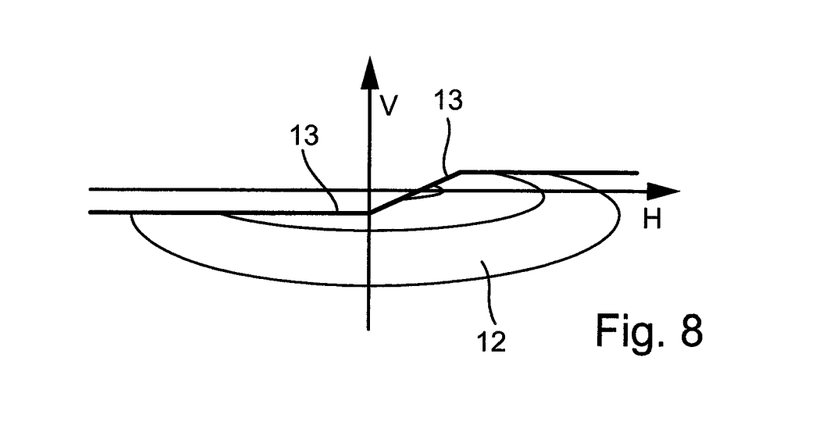
FIG. 8 shows a corresponding light distribution for low-beam light imaged on a measurement screen arranged in front of the projection module.

What are also advantageous are primary optical units which are embodied as attachment lenses and in which the beam path is divided, wherein one radiation beam is projected through a lens and further radiation beams are reflected at a totally reflecting reflector surface. A corresponding embodiment is illustrated in FIGS. 3 and 4. In this case, instead of the reflector 5, an optical element 9' in the form of an attachment lens is provided. In this case, the optical element 9 is integrated into the primary optical unit assigned to the low-beam light LEDs 2. The light emitted by the low-beam light LEDs 2 is coupled into the optical element 9' and is coupled out via the coupling-out surface 9'b after total reflection at the outer peripheral surface of the optical element 9' and at the total reflection surface 9'a. An adaptation of the light distribution can be obtained by varying the form and/or the course of the surfaces 9'a and 9'b. It is thereby possible, for example, to focus the central radiation beam. The corresponding beam path is illustrated in FIG. 7 and the corresponding resulting light distribution 12 for low-beam light with an asymmetrical bright-dark boundary 13 is illustrated in FIG. 8. The total reflection surface 9'a of the optical element 9' has, in an imaginary sectional area extending transversely with respect to the optical axis 10, a course corresponding to the course of the bright-dark boundary 13 (cf. FIG. 6). That edge of the optical element 9' which serves for generating the bright-dark boundary is highlighted in bold and designated by the reference symbol 9'f.

Figure 9:
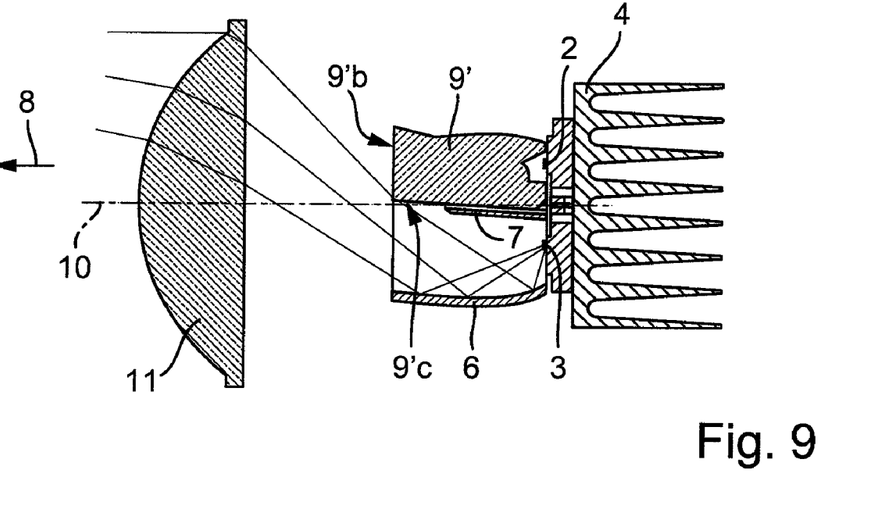
FIG. 9 shows the projection module from FIG. 4 with a beam path for illuminating a region on a measurement screen arranged in front of the projection module above the light distribution for low-beam light.
Figure 10:
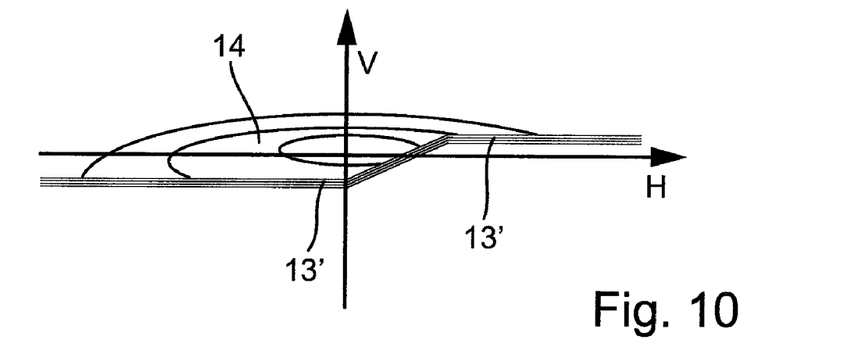
FIG. 10 shows a corresponding light distribution imaged on the measurement screen above the light distribution for low-beam light.

FIG. 9 illustrates the beam path only of the high-beam light LEDs 3 by way of example for the second embodiment in accordance with FIGS. 3 and 4. Part of the light emitted by the LEDs 3 is coupled into the optical element 9' at the location 9'c via the totally reflecting lower surface 9'a and is then coupled out again through the coupling-out surface 9'b. The resulting light distribution 14 with the blurred or unsharp bright-dark boundary 13' is illustrated in FIG. 10.

Figure 11:
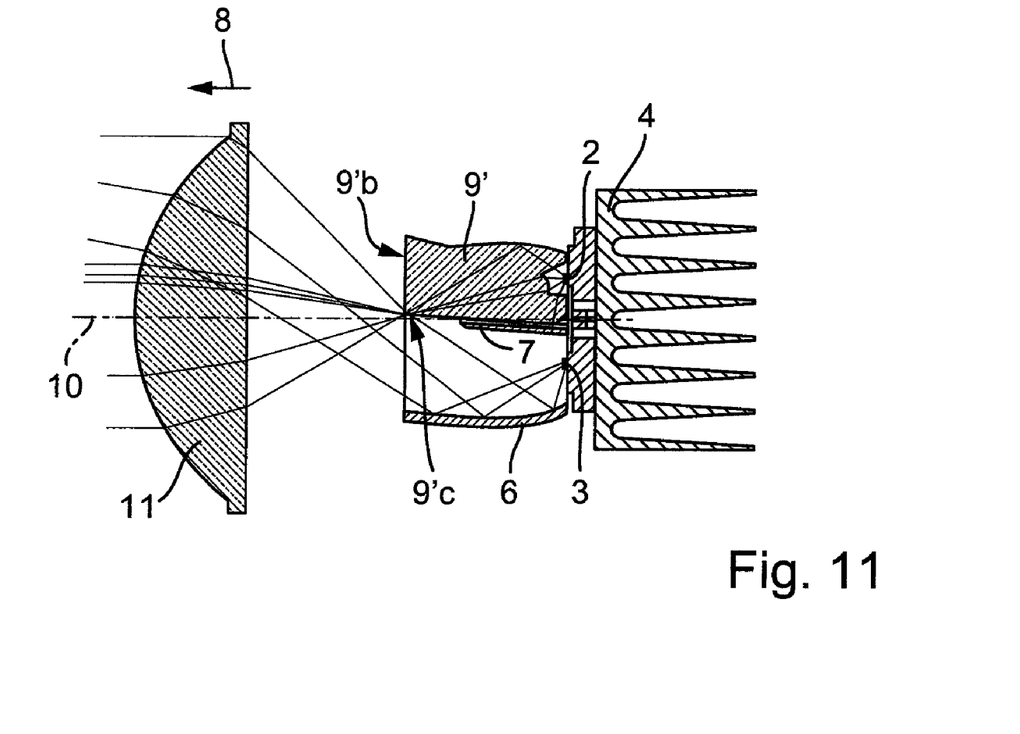
FIG. 11 shows the projection module from FIG. 4 with beam paths for generating a light distribution for high-beam light.
Figure 12:
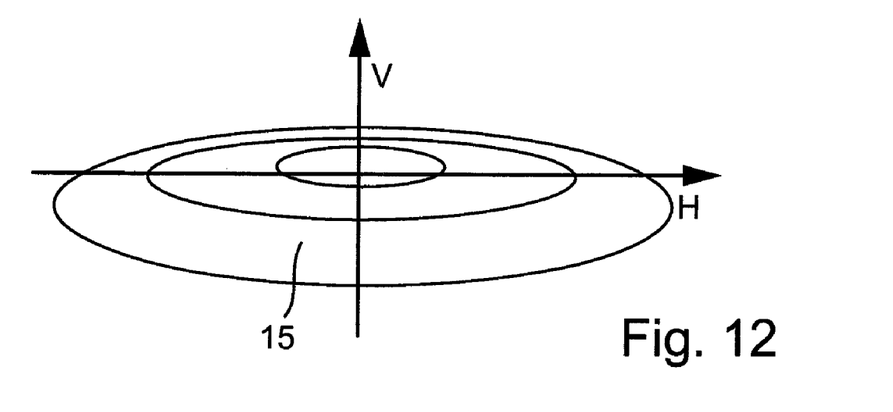
FIG. 12 shows a corresponding light distribution for high-beam light imaged on a measurement screen arranged in front of the projection module.

If the high-beam light LEDs 3 are activated simultaneously with the low-beam light LEDs 2, that part of the light emitted by the LEDs 3 and reflected by the reflector 6 which is coupled into the optical element 9' mixes in the optical element 9' with the light emitted by the low-beam light LEDs 2. The consequence is a high-beam light distribution without dark or colored lines at the location of the bright-dark boundary. The corresponding beam path in the case of simultaneously activated low-beam light LEDs 2 and high-beam light LEDs 3 is illustrated by way of example in FIG. 11. FIG. 12 shows the resulting high-beam light distribution 15.

One essential aspect of the present invention can be seen in the optical element 9, 9', into which the low-beam light radiation bundle formed by one light source group 2 and the associated focusing primary optical unit 5, 9' is coupled. Said optical element 9, 9' has, as light exit surface 9b, 9'b, an end side positioned approximately in the focal plane of the projection lens 11. Said light exit surface 9b, 9'b is delimited by lateral surfaces, wherein a lower surface 9a, 9'a of these side surfaces has the contour of the bright-dark boundary for a light distribution for low-beam light. The beams coupled into the optical element 9, 9' impinge on said surface 9a, 9'a at such a shallow angle that they are totally reflected there. The low-beam light beam is effectively delimited by this totally reflecting surface 9a, 9'a, such that the light coupled out from the end side 9b, 9'b has a sharp bright-dark boundary 13 which is projected onto the roadway by the projection lens 11 in order to generate a light distribution for low-beam light. If the focusing optical unit for the light sources 2 for low-beam light is embodied as an attachment lens 9' (or optical waveguide or glass body), then the totally reflecting surface 9'a for generating the bright-dark boundary 13 can be integrally formed directly on said attachment lens 9' (cf. FIG. 6).

In contrast to this, the radiation beam formed by the second light source group 3 and the associated primary optical unit 6, also referred to hereinafter as high-beam light or partial high-beam light radiation beam, is substantially not guided through the optical element 9, 9' described above, but rather focused past the latter more or less precisely into the center of the focal plane of the projection lens 11. A small part of the light which is nevertheless incident on the optical element 9, 9' from said high-beam light radiation beam couples into said optical element at the location 9c, 9'c and mixes there with the low-beam light beam path.

What is brought about as a result is that when the light sources 3 for the high-beam light radiation beam are switched in, the two beam paths mix or overlap in the optical element 9, 9', as a result of which the bright-dark boundary 13 generated by the low-beam light radiation beam is completely resolved and becomes blurred.

Figure 17:
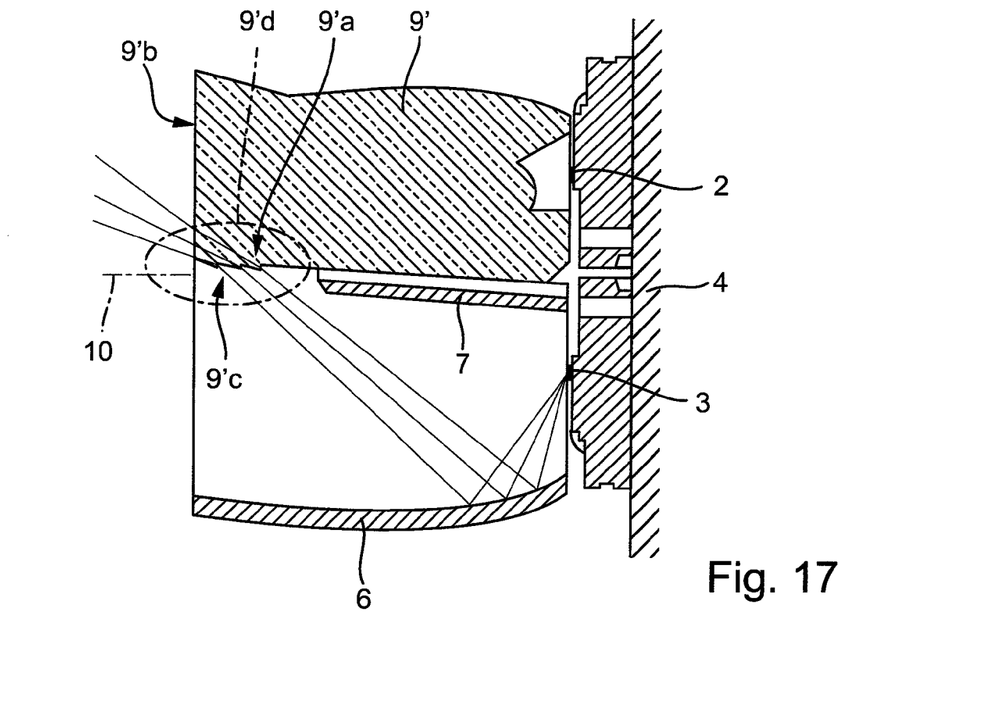
FIG. 17 shows the projection module from FIG. 4 with an optical element arranged in the beam path of the radiation beam emitted by the first light source group and having optically active structures on a totally reflecting underside of the optical element.

The mixing of the two beam paths in the optical element 9, 9' can be improved by optically active structures embodied in any desired manner being applied to that surface 9a, 9'a of the optical element 9, 9' which is totally reflecting for the low-beam light beam path. In the exemplary embodiment illustrated in FIG. 17, prisms 9'd are applied to the totally reflecting surface 9'a of the optical element 9'. The coupling of the high-beam light radiation beam emitted by the high-beam light LEDs 3 into the optical element 9' at the location 9'c is thereby improved. As an alternative, the structures can also comprise a matt finish or finely diffusing optical surfaces, e.g. any desired three-dimensional freeform optical unit, a stepped optical unit, a cylindrical lens optical unit, a spherical surface optical unit or a pad or cushion optical unit. A cushion optical unit has e.g. the form of a convexly shaped lens with a quadrangular base area and with inwardly curved side lines. With regard to the configuration and the function of a cushion optical unit, attention is drawn to DE 10 2008 061 688 to which reference is expressly made in this connection.

Figure 18:
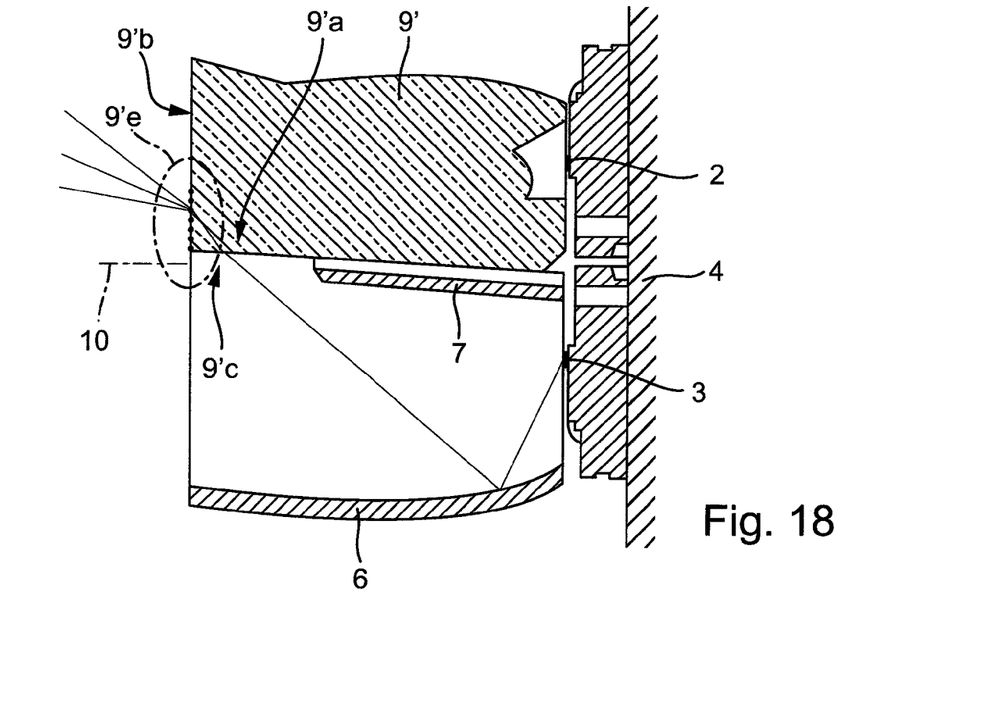
FIG. 18 shows the projection module from FIG. 4 with an optical element arranged in the beam path of the radiation beam emitted by the first light source group and having optically active structures on a coupling-out surface of the optical element, said coupling-out surface being directed to the secondary optical unit.

As an alternative, in the exemplary embodiment from FIG. 18, optically active structures 9'e in the form of a matt finish or finely diffusing optical surfaces (for example cylindrical, spherical or cushion surfaces) are applied at least on a part of the coupling-out surface 9'b of the optical element 9'. Said structures 9'e ensure that a larger part of the high-beam light radiation beam coupled into the optical element 9' emerges again from the latter and is subsequently projected onto the road by the lens 11.

Figure 15:
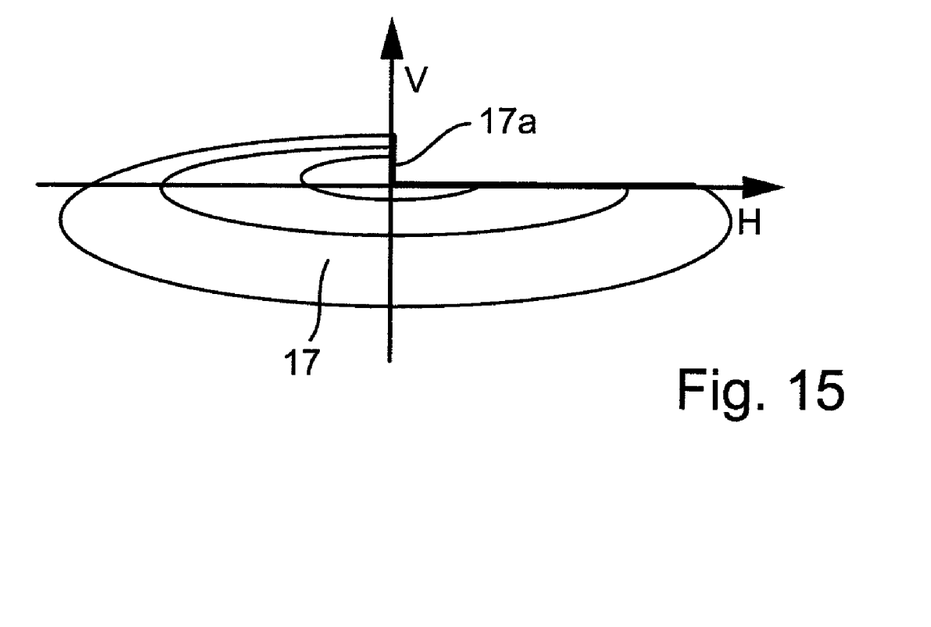
FIG. 15 shows a light distribution for partial high-beam light of the projection module according to the invention for a left headlight.
Figure 16:
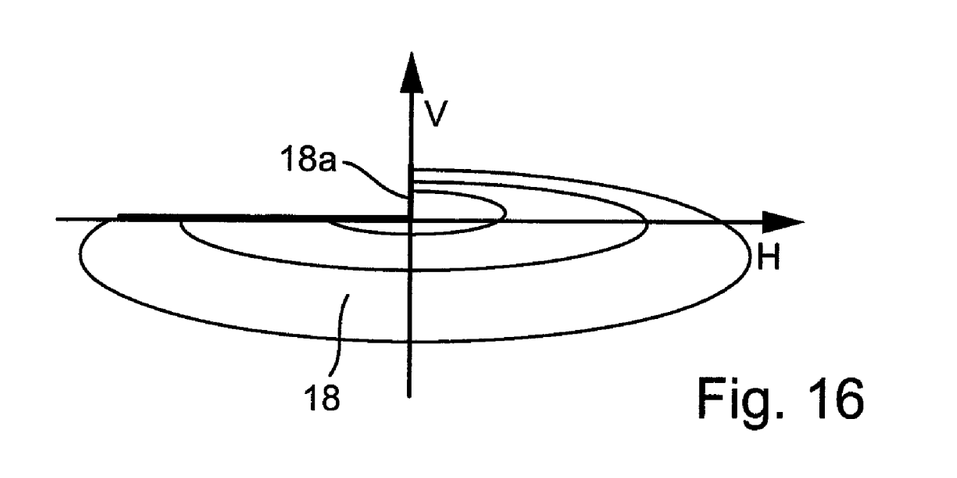
FIG. 16 shows a light distribution for partial high-beam light of the projection module according to the invention for a right headlight.

In accordance with a further embodiment of the invention, an additional light-absorbing diaphragm 16 is arranged approximately in the focal plane of the projection lens 11, said diaphragm having a vertical edge 16a (cf. FIGS. 1 to 4). The high-beam light radiation beam emerging from the light exit opening of the lower primary optical unit 6 can be delimited in a horizontal direction by the diaphragm 16. A so-called light distribution 17, 18 for partial high-beam light (cf. FIGS. 15 and 16) with a vertical bright-dark boundary 17a, 18a can thereby be obtained. Regions of the high-beam light distribution 15 in which road users travelling ahead or oncoming road users are situated can be screened by the diaphragm 16. This prevents these road users from being dazzled. The position of the road users is determined by suitable sensors (e.g. a camera that detects the zone ahead of the vehicle) and evaluation of the sensor signals. In order that the correct region of the high-beam light is always screened even in the case of moving road users that are travelling ahead or oncoming, the diaphragms 16 can be movable, in particular horizontally displaceable transversely with respect to the optical axis. It is thereby possible for the screened region of the high-beam light distribution 15 to follow the position of an oncoming road user.

In this way, with an individual light module 1, according to the invention, by changing over the light sources 2, 3 contained therein, a light distribution for low-beam light and a light distribution for high-beam light or a light distribution for low-beam light and a light distribution for partial high-beam light can be generated, without this necessitating mechanically movable diaphragms or outlay on a plurality of light modules or projection lenses.

The light module 1 according to the invention differs from the known light modules in particular by virtue of the optical element 9, 9' for the beam splitting with the characteristic integrally formed edge 9f, 9'f for generating the bright-dark boundary 13. In addition, the light module 1 according to the invention comprises two separate light source groups 2, 3 with separate leads and generates the characteristic light distributions with and without a sharp bright-dark boundary 13 (horizontal) and 17a, 18a (vertical) solely by means of the targeted activation/deactivation of the light sources 2, 3.

The present invention can be employed for example in so-called full-LED headlights (exclusively LEDs are used as light sources) in which a pivotable spot module is embodied as a switchable low-beam light/high-beam light module or as a low-beam light/partial high-beam light module. The principle on which the present invention is based likewise makes it possible to realize a low-beam light/high-beam light basic module which then only requires one headlight chamber. As an alternative, it is conceivable, with the principle according to the invention, to obtain a high-beam light distribution by virtue of two light distributions for partial high-beam light (cf. FIGS. 15 and 16) being moved toward one another by means of an ALD (adaptive light distribution) drive, which actually serves for generating adaptive cornering light, in such a way that there is no longer an umbra. The two light distributions for partial high-beam light then complement one another to form a complete light distribution for high-beam light. In all cases, lens, cooling, pivoting actuator system and actuator system for the basic setting can be utilized jointly and/or simultaneously for two luminous functions.

The light sources 2, 3 can emit both light visible to the human eye and invisible IR radiation. The IR radiation can be used for night vision devices for vehicles. In this case, a region in front of the vehicle that corresponds approximately to the high-beam light region is illuminated with IR radiation, the radiation reflected at objects situated in said region is detected by means of a suitable IR camera (e.g. CCD camera), evaluated and conditioned and the result is presented to the driver of the vehicle. The objects detected by means of IR radiation can be represented on a screen or be inserted onto the windshield into the driver's field of view.

The invention claimed is:

1. A projection module for a motor vehicle headlight for generating at least one predetermined light distribution, the module comprising a plurality of light sources for emitting electromagnetic radiation, at least one primary optical unit for concentrating the radiation emitted by the light sources, and a secondary optical unit arranged in the beam path of the concentrated radiation and serving for imaging the radiation beam on a roadway in front of the motor vehicle, wherein the light sources are subdivided into at least two groups, wherein, for generating at least two different light distributions, the different light source groups can be activated independently of one another, wherein an optical element is arranged in the beam path of a radiation beam emitted by a first light source group, between the at least one primary optical unit and the secondary optical unit, into which optical element the radiation beam emitted by the first light source group is coupled in and is coupled out again in order to generate a low-beam light distribution with a horizontal bright-dark boundary, and wherein a further light source group can additionally be activated in order to generate a high-beam light distribution, wherein the radiation beam emitted by the further light source group illuminates a region of the light distribution above the bright-dark boundary.

2. The projection module as claimed in claim 1, wherein part of the radiation beam emitted by the further light source group is coupled into the optical element, mixes there with the radiation beam emitted by the first light source group and coupled into the optical element and is coupled out from the optical element together with the latter beam in order to generate an unsharp bright-dark boundary.

3. The projection module as claimed in claim 1, wherein a coupling-out surface of the optical element, said coupling-out surface being directed to the secondary optical unit, extends in a focal plane of the secondary optical unit.

4. The projection module as claimed in claim 1, wherein the optical element is embodied as a substantially rectangular totally reflecting optical body which is arranged substantially above an optical axis of the module and whose underside, which is directed to the optical axis, is embodied in totally reflecting fashion.

5. The projection module as claimed in claim 4, wherein the underside of the optical body, said underside being directed to the optical axis, has, as viewed in a sectional area perpendicular to the optical axis, a course corresponding to the bright-dark boundary of the low-beam light distribution.

6. The projection module as claimed in claim 1, wherein the optical element delimits the radiation beam emitted by the first light source group and coupled into the optical element by total reflection in such a way that a projection of the delimited radiation beam onto the roadway in front of the motor vehicle generates the low-beam light distribution with a bright-dark boundary.

7. The projection module as claimed in claim 1, wherein the optical element delimits the radiation beam emitted by the first light source group and coupled into the optical element by total reflection and permits part of the radiation beam generated by the further light source group and coupled into the optical element to pass through without total reflection.

8. The projection module as claimed in claim 1, wherein each light source group is assigned a dedicated primary optical unit.

9. The projection module as claimed in claim 1, wherein at least one of the primary optical units is embodied as a totally reflecting optical body.

10. The projection module as claimed in claim 9, wherein the primary optical unit assigned to the first light source group is embodied as a totally reflecting optical body.

11. The projection module as claimed in claim 10, wherein the optical element for generating the horizontal bright/dark boundary of the low-beam light distribution is an integral component part of the primary optical unit assigned to the first light source group.

12. The projection module as claimed in claim 10, wherein the primary optical unit assigned to the first light source group is embodied as a totally reflecting optical body which is arranged substantially above an optical axis of the module and whose underside which is directed to the optical axis, is embodied in totally reflecting fashion.

13. The projection module as claimed in claim 12, wherein the underside of the optical body, said underside being directed to the optical axis, has, as viewed in a sectional area perpendicular to the optical axis, a course corresponding to the bright-dark boundary of the low-beam light distribution.

14. The projection module as claimed in claim 1, wherein at least one of the primary optical units is embodied as a reflector.

15. The projection module as claimed in claim 14, wherein the primary optical unit assigned to the further light source group is embodied as a reflector.

16. The projection module as claimed in claim 1, wherein a diaphragm element having a substantially vertically extending edge for generating a vertical bright-dark boundary of a partial high-beam light distribution is arranged in the beam path of the radiation beam emitted by the further light source group, between the at least one primary optical unit and the secondary optical unit.

17. The projection module as claimed in claim 16, wherein the diaphragm element is embodied in movable fashion.

18. The projection module as claimed in claim 17, wherein the diaphragm element is displaceable in a plane extending perpendicularly to the optical axis of the module.

19. The projection module as claimed in claim 18, wherein the diaphragm element is displaceable in a horizontal direction in a plane extending perpendicularly to the optical axis of the module.

20. The projection module as claimed in claim 16, wherein the diaphragm element extends in a focal plane of the secondary optical unit.

21. The projection module as claimed in claim 9, wherein optically active structures are applied at least on a part of the totally reflecting underside and/or the coupling-out surface— directed to the secondary optical unit—of the optical element arranged in the beam path of the radiation beam emitted by the first light source group or the primary optical unit assigned to the first light source group.

22. The projection module as claimed in claim 21, wherein the optically active structures comprise a matt finish, a free surface form, a stepped optical unit, a prism optical unit, a cylindrical lens optical unit, a spherical surface optical unit or a pad or cushion optical unit.

23. The projection module as claimed in claim 1, wherein the light sources are embodied as semiconductor light sources.

24. The projection module as claimed in claim 1, wherein the light sources emit radiation in a wavelength range visible to the human eye.

25. The projection module as claimed in claim 1, wherein the secondary optical unit is embodied as a projection lens.

26. A motor vehicle headlight comprising a housing and, arranged therein, a light module for generating at least one predetermined light distribution, wherein the light module is embodied as a projection module as claimed in claim 1.

27. The headlight as claimed in claim 26, wherein the light module is mounted in the housing in a manner such that it is pivotable in a horizontal direction.

* * * * *